United States Patent

Hill et al.

[15] 3,688,076
[45] Aug. 29, 1972

[54] WELDING APPARATUS FOR WELDING AN EXTENSION PIECE TO A TUBE

[72] Inventors: William G. Hill, London; Robert A. C. Bromwich, Marlow, both of England

[73] Assignee: Foster Wheeler Corporation, Livingston, N.J.

[22] Filed: June 30, 1970

[21] Appl. No.: 51,241

[52] U.S. Cl. .............................. 219/125 R, 219/60 A
[51] Int. Cl. ................................................. B23k 9/12
[58] Field of Search ....... 219/125 R, 124, 60 A, 60 R, 219/61, 137

[56] References Cited

UNITED STATES PATENTS

| 3,207,408 | 9/1965 | Thome et al. | 219/125 X |
| 1,949,251 | 2/1934 | Gilbert | 219/125 |
| 3,114,830 | 12/1963 | Wotitzky et al. | 219/125 |
| 3,461,264 | 8/1969 | Nelson et al. | 219/60 |
| 3,142,745 | 7/1964 | Gotch | 219/125 |

Primary Examiner—R. F. Staubly
Assistant Examiner—L. A. Schutzman
Attorney—John Maier, III, Marvin A. Naigur and John E. Wilson

[57] ABSTRACT

The present invention relates to an electric arc welding torch for welding an extension piece out an open end tubular part which is in an inaccessible position. The torch has a welding head which can be of conventional form and is rotatable relative to a torch body. From the body extend a number of arms which are arranged to hold the extension piece aligned with the torch body. The body also caries a tapered guide which is arranged to fit within the open-ended tubular member and so center and locate the body and extension piece relative to the tubular member. In a preferred embodiment the arms have magnets at the free ends to hold the extension piece until it has been welded in place on the tubular part.

9 Claims, 2 Drawing Figures

WELDING APPARATUS FOR WELDING AN EXTENSION PIECE TO A TUBE

This invention relates to improvements in electric arc welding torches.

BACKGROUND TO THE INVENTION

On certain occasions it is necessary to join an extension piece to a tubular part by means of a circumferential weld when the weld region is completely inaccessible. For example, it can happen that a tubular part in or near the core of a nuclear reactor will need to be fitted with an extension piece such as a circular flange; in these circumstances it is not safe for a man to reach the weld region so as to position the flange or the torch. Therefore, these two operations must be carried out under remote control.

It is, therefore, an object of the invention to provide a welding torch which is capable of achieving these two operations accurately and under remote control.

THE INVENTION

According to the invention there is provided an electric arc welding torch for welding an extension piece onto an open-ended tubular part comprising:

a. a torch body,
b. an electric arc welding head carried by said body and rotatable relative to said body,
c. an electrode forming part of said head and arranged to be carried around the weld region during rotation of said head relative to said body to make a weld,
d. means for supplying welding current to said electrode,
e. arms extending from said body,
f. means on said arms for holding said extension piece aligned with said body until after said extension piece has been joined to said tubular part, and
g. a tapered guide carried by said body which tapers in the direction away from said body so that, as the guide progressively enters said open-ended tubular part, said guide is arranged to progressively center said body and extension piece until said guide centers said body and piece relative to said tubular part ready for welding said extension piece to said tubular body.

Such a torch can be used under remote control. For example, the body of the torch can be suspended and lowered onto the tubular part from above, using for example, television to guide the tapered guiding part onto the tube. This part then enters the tubular part and accurately centers the torch so that the welding head is correctly aligned in relation to the tubular part. This also correctly positions the extension piece relatively to the tubular part and holds it there during welding. Once the weld has been completed, the torch is removed after the extension piece has been released from the arms extending from the torch body.

When the torch is suspended from above preferably the tapered guide should be relatively heavy so as to hold the torch down firmly in position during welding. The tapered guide can be of any convenient shape such as a spherical cone or truncated spherical cone or is conical.

The welding head can effect the weld from within the bore of the tubular part or from the outside, normally, however, it is simpler for the head to make the weld from within the bore and then the head can conveniently be mounted on a spindle which is rotatable within the torch body, a suitable drive being provided to rotate the head during welding.

The welding head can have a non-consumable tungsten electrode and provision can be made to shield the region of the arc with an inert shielding gas such as argon.

A convenient way of attaching the extension piece to the arms is by means of magnets, these grip the extension piece firmly but can readily be caused to lose their grip once the extension piece has been welded in place and the torch is to be removed. The magnets can be permanent or electro-magnets.

In some cases it may be desirable to have the torch correctly oriented relatively to the tubular part. If the latter has a small cut-out or indentation this can readily be achieved by means of a finger projecting from the body which, when it is aligned with the cut-out or indentation in the tubular part, will cause, for example, a micro-switch to send an electrical signal to the operator.

BRIEF DESCRIPTION OF THE DRAWINGS

FIG. 2 is a side view, partly in section to show better the positions of the welding head and electrode while the present torch is mounted to weld a seam.

DESCRIPTION OF THE PREFERRED EMBODIMENT

Figure 1:
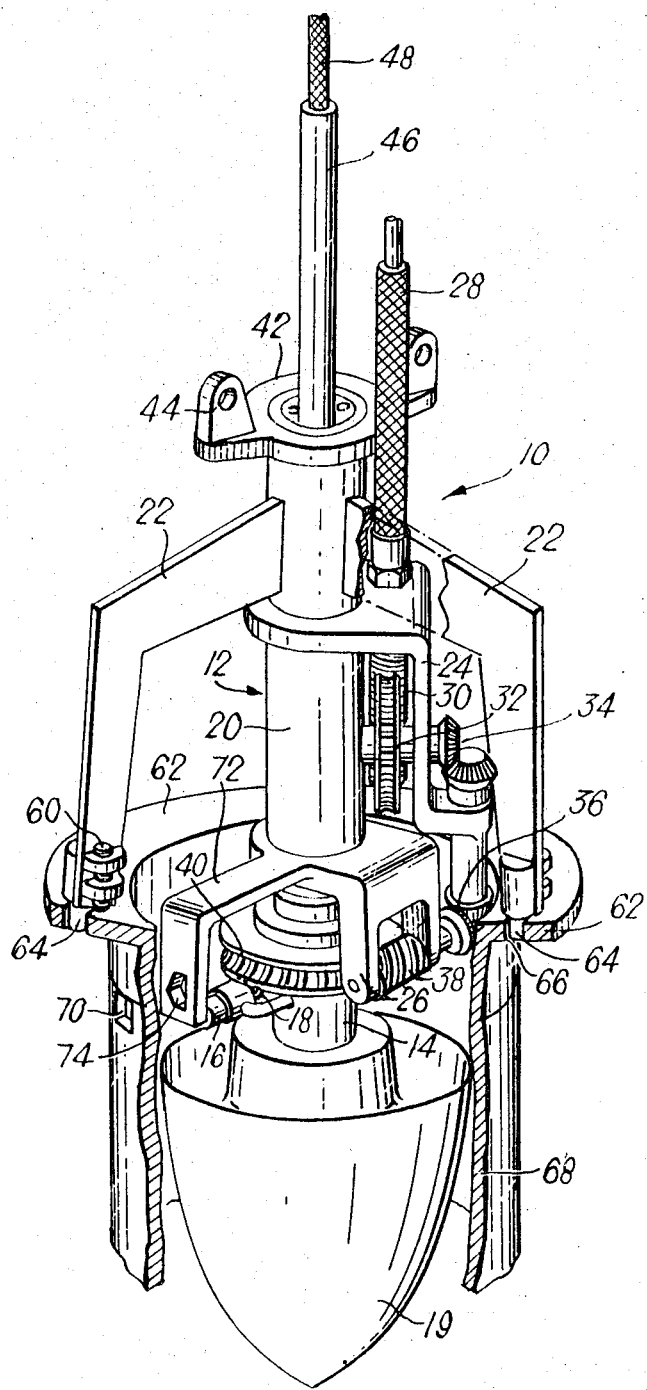
FIG. 1 is a view in perspective with parts cut away to show the present invention.

The welding torch 10 shown in the drawings comprises a sleeve-shaped torch body 12 having rotatably mounted within it a spindle 14. Fixed to the latter is a welding head 16 containing a non-consumable electrode 18. The head 16 can be of conventional design and is therefore not shown in detail. It will of course, hold the electrode 18 at the correct orientation relative to the weld to be made and will have outlet means through which a stream of inert shielding gas is supplied to blanket the weld region in the normal way. Around the lower end of the spindle 14 is mounted a guide 19 on roller bearings (not shown) so as to be freely rotatable relatively to the spindle.

The body 12 has a sleeve part 20 and from this extend three arms 22 spaced 120° to one another. Also the sleeve part 20 has rigidly fixed to it an intermediate bracket 24 and a lower bracket 26. The intermediate bracket 24 has attached to it a drive cable 28 and 30 and drive is taken from this to the spindle 14 by means of a worm 30 meshing with a wormwheel 32, pairs of meshing bevel gears 34 and 36 and a worm 38 meshing with a wormwheel 40 fixed to the spindle 14, the worm 30, wormwheel 32, bevel gears 34 and 36 and worm 38 being journalled on the brackets 24 and 26. At the upper end of the sleeve part 20 is a flange 42 having lugs 44 from which it is supported by suitable cables (not shown).

The center of the spindle 14 is hollow and electric current and inert shielding gas are taken to the head 16 from a tube 46 having a conductive core 48 which passes down the middle of the spindle to the head 16.

Each of the arms has at its outer end a magnet 60 for holding an extension flange 62 against the arm, these magnets can be permanent or electro-magnets. Also the arms have small projecting pins 64 which locate in holes 66 in the flange 62.

The guide 19 is shown as being convex spherical cone shape. It could equally be truncated, this shape having the advantage that the guide can be made heavier which ensures that the torch is held down firmly in place and not easily displaced during a welding run.

The torch 10 is used as follows. First a flange 62 is fixed to the arms 22 by fitting the pins 64 in the holes 66 in the flange. The magnets 60 then firmly hold the flange to the torch. The torch is now lowered to a tube 68 to which the flange is to be welded. The operator will normally watch the lowering of the torch 10 by means of television and will allow the guide to enter the open end of the tube 68. The maximum diameter of the guide is a close fit within the tube 68 and so as the guide is entering the tube, its increasing size gradually aligns the torch until finally the guide fits within the tube and centers the torch and accordingly the head 16 accurately. Because the torch is accurately positioned the flange will also be accurately aligned. The lowering of the torch is of course continued until the lower end of the flange 62, sits on the upper end of the tube 68, the weight of the guide 19 then keeps the torch in place. FIG. 2 shows clearly the position of parts when the torch and flange are accurately positioned for welding a seam.

A weld is now made by striking an arc from the electrode 18 and rotating the spindle 14 and head 16. After completion of welding the torch can be raised and in so doing the grip of the magnets 60 on the flange is lost and the flange is left behind welded to the tube.

As can be appreciated the torch 10 is simple both in construction and operation. However, it readily enables one to achieve accurate positioning and welding of the flange 62 to the tube 68 even though the latter may be inaccessible and, for example, a considerable distance below the operator.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

We claim:

1. An electric arc welding torch for welding an extension piece onto an open-ended tubular part comprising:
   a. a torch body,
   b. an electric arc welding head carried by said body and rotatable relative to said body,
   c. an electrode forming part of said head and arranged to be carried around the weld region during rotation of said head relative to said body to make a weld,
   d. means for supplying welding current to said electrode,
   e. arms extending from said body,
   f. means on said arms for releasably holding said extension piece aligned with said body,
   g. means for transferring said body and said extension piece while held together by said means on said arms to bring said extension piece into abutment with said tubular part, and
   h. a tapered guide carried by said body which tapers in the direction away from said body so that, as the body and extension piece are moved while held together, the guide progressively enters said open-ended tubular part, said guide being arranged to progressively center said body and extension piece until said guide centers said body and piece relative to said tubular part ready for welding said extension piece to said tubular body.

2. A torch according to claim 1 further comprising means for suspending said torch body from above so that, when said body is suspended from above said tapered guide is below said body.

3. A torch according to claim 2 in which said guide is heavy relative to said body so as to keep said torch relatively steady during welding.

4. A torch according to claim 1 in which said tapered guide has a shape chosen from a spherical cone shape, a truncated spherical cone shape and a conical shape.

5. A torch according to claim 1 in which said electrode has a tip and is outwardly directed relative to said body, said tip being within the radial size of the widest part of said tapered guide, whereby said torch is capable of effecting welding from inside said tubular part.

6. A torch according to claim 5 further comprising a spindle rotatably mounted within said torch body, said head being mounted on said spindle, and means being provided for rotating said spindle relative to said body during the making of a weld.

7. A torch according to claim 1 further comprising magnets mounted on said arms for holding said extension piece against said arms.

8. An electric arc welding torch for welding an extension piece onto an open-ended tubular part comprising:
   a. a torch body,
   b. a spindle rotatably mounted in said body,
   c. a welding head mounted on said spindle so as to be rotatable relative to said body,
   d. means for rotating said spindle and said head relative to said body,
   e. a non-consumable electrode forming part of said head and arranged to be carried around the region of the weld by rotation of said head relative to said body during the making of a weld,
   f. means for supplying welding current to said electrode,
   g. means for supplying inert shielding gas to the region of said electrode to bracket said region of said weld during welding,
   h. a number of arms spaced around said body and extending radially away from said body,
   i. magnet means carried by said arms for holding said extension piece aligned with said body until after it has been welded to said tubular part,
   j. means to transfer said extension piece and body while held together by said magnet means to bring said extension piece into engagement with said tubular part,
   k. a spherical cone shaped guide mounted on said spindle, said guide being heavy relative to said torch body and being tapered from the base of said cone to the tip of said cone in the direction away from said body, the widest part of said cone being of substantially the same diameter as the inside diameter of said tubular part, and l. anti-friction means between said spindle and said guide so that said guide is free to rotate relative to said spindle, whereby when said body is moved to bring said guide into said tubular part at a point where said extension is aligned with said tubular part, said spindle can be rotated to weld said extension to said tubular part.

9. A torch according to claim 8 in which said electrode has a tip and is outwardly directed relative to said body, said tip being within the radial size of the widest part of said tapered guide, whereby said torch is capable of effecting welds from inside said tubular part.

* * * * *